(12) United States Patent
Fukuda et al.

(10) Patent No.: US 6,312,851 B1
(45) Date of Patent: Nov. 6, 2001

(54) SEALED SECONDARY BATTERY ASSEMBLY

(75) Inventors: Shinsuke Fukuda; Mitsugu Takaki, both of Toyohashi; Kenji Sato, Osaka; Akira Iwamura, Toyohashi; Toshinobu Yokoyama, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/331,025

(22) PCT Filed: Oct. 19, 1998

(86) PCT No.: PCT/JP98/04722

§ 371 Date: Jun. 15, 1999

§ 102(e) Date: Jun. 15, 1999

(87) PCT Pub. No.: WO99/21236

PCT Pub. Date: Apr. 29, 1999

(30) Foreign Application Priority Data

Oct. 20, 1997 (JP) .................................................... 9-287304

(51) Int. Cl.[7] .............................. H01M 2/04; H01M 2/08
(52) U.S. Cl. ........................ 429/176; 429/175; 429/148; 429/120; 429/57; 429/158
(58) Field of Search ................................. 429/175, 176, 429/163, 99, 149, 151, 156, 160, 148, 71, 120, 177, 57, 59, 158

(56) References Cited

U.S. PATENT DOCUMENTS

| | | | |
|---|---|---|---|
| 4,720,440 | * | 1/1988 | Yonezu et al. ........................... 429/57 |
| 4,724,190 | * | 2/1988 | Siga et al. ............................. 429/158 |
| 5,344,725 | * | 9/1994 | Ide et al. ............................... 429/160 |
| 5,800,942 | * | 9/1998 | Hamada et al. ....................... 429/148 |
| 5,906,899 | * | 5/1999 | Noda et al. ........................... 429/149 |

FOREIGN PATENT DOCUMENTS

| | | |
|---|---|---|
| 49-124518 | 10/1974 | (JP) . |
| 52-51035 | 4/1977 | (JP) . |
| 7-85847 | 3/1995 | (JP) . |
| 7-235326 | 9/1995 | (JP) . |

\* cited by examiner

*Primary Examiner*—Gabrielle Brouillette
*Assistant Examiner*—R. Alejandro
(74) *Attorney, Agent, or Firm*—Jordan and Hamburg LLP (57) ABSTRACT

A sealed secondary battery assembly in which electricity-generating elements (1) are accommodated in battery cases (3) formed in rectangular tubular shape having a bottom, a plurality of cells (2a to 2j) constituted by sealing the apertures of battery cases (3) by covers (4) are arranged in series, and these are electrically connected by means of electrical connecting elements (9), wherein the battery cases (3) of the individual cells (2a to 2j) are constituted by a unitary battery case (51) and electrical connection elements (9) are arranged so as to pass through partition sections (53, 54) that define the space for the individual cells (2a to 2j), and coolant passages (55, 56) that communicate with the outside are formed in the partition sections (53, 54).

13 Claims, 10 Drawing Sheets

SEALED SECONDARY BATTERY ASSEMBLY

TECHNICAL FIELD

The present invention relates to a sealed secondary battery assembly employed for nickel-hydrogen secondary batteries or the like constituting the drive power source for an electric vehicle.

BACKGROUND ART

Figure 16:
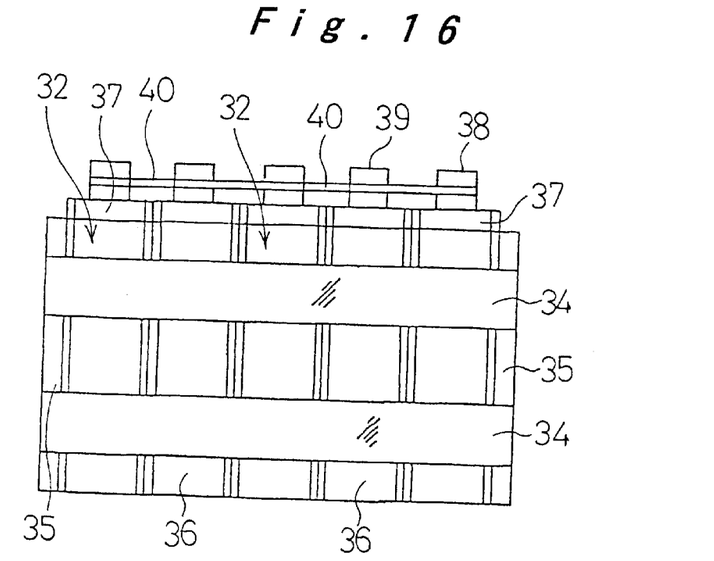
FIG. 16 is a front view showing a prior art example.

Sealed secondary battery assemblies of this type are previously known and are disclosed in Laid-Open Japanese Patent Publication No.7-85847. This prior art example has a construction as shown in FIG. 16. Specifically, electricity generating elements are accommodated in battery cases 36 formed in rectangular tubular shape having a bottom, the apertures of these battery cases 36 are sealed by covers 37 to constitute cells 32, a plurality of which are arranged in series, the battery cases 36 of these cells 32 being connected in tightly restrained condition by means of end plates 35 and restraining straps 34. Also, pillar-shaped positive electrode terminals 38 and negative electrode terminals 39 of the cells 32 penetrate through covers 37 and project above them, these terminals 38 and 39 being electrically connected by means of an electrical connection bar 40.

Figure 17:
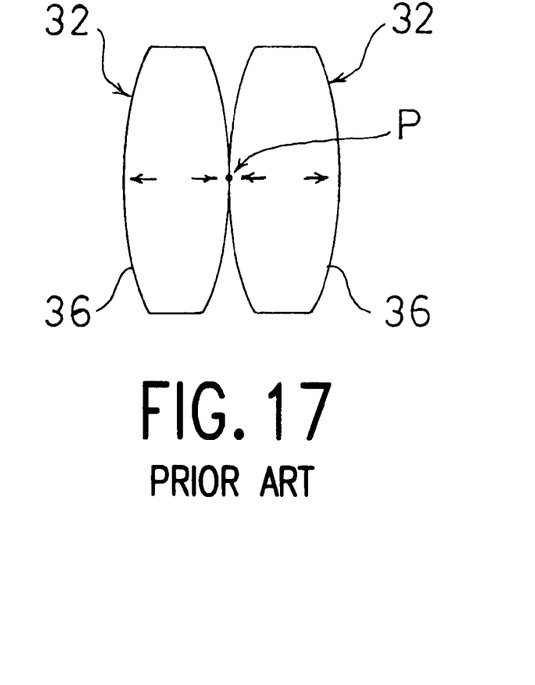
FIG. 17 is a diagram showing problems of the prior art example.

However, with a construction as in the prior art example wherein battery cases 36 are tied together and held in restrained fashion by means of end plates 35 and restraining straps 34, when the cells 32 expand as for example during charging, a condition as shown in FIG. 17 is produced, with stress being concentrated at the portions indicated by P.

This stress concentration gives rise to creep deformation and as a result the durability of battery cases 36 in regard to vibration or shock is severely impaired.

Also, in the case of a construction as in the prior art example in which the positive electrode and negative electrode terminals 38 and 39 project above cover 37 and are electrically connected by an electrical connection bar 40, the secondary battery is increased in height by the amount to which the positive electrode and negative electrode terminals 38 and 39 project above cover 37; this is contrary to demands for increased compactness. Also, there was the problem that sealing had to be carried out individually between positive electrode and negative electrode terminals 38, 39 and cover 37 and if sealing was insufficient internal liquid or gas could leak directly to the outside.

Also, with a construction as in the prior art example wherein the electrical connection between the individual cells is effected on the outside, the positive electrode and negative electrode terminals 38 and 39 must be given a sealing function, electrical connection function, and function of effecting connection between themselves and the electricity-generating elements within the batteries. The construction of the positive electrode and negative electrode terminals 38 and 39 therefore becomes complicated and costly, and, as a result, the total cost of the sealed secondary battery assembly becomes high.

Figure 18:
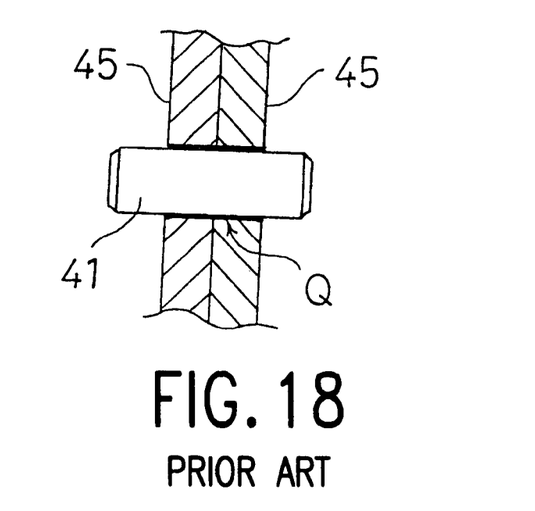
FIG. 18 is a diagram showing problems of the internally connected construction.

In the light of the above demands for compactness and demands for ensuring sealing strength and lowering costs, the inventors of the present invention conceived, as a way of solving the problems of the prior art example, an internally connected construction wherein electrical connection between the terminals is made within the batteries. In this internally connected construction, as shown in FIG. 19, electrical connection between two cells 32, 32 is made using an electrical connecting rod 41 that passes through the connecting walls 45, 45 of adjacent battery cases 36. Then, at the location Q where electrical connecting rod 41 passes through, the three items: electrical connecting rod 41 and the two connecting walls 45, 45 are integrally coupled by a resin welding technique.

However, if the internally connected construction shown in FIG. 18 is adopted, when cells 32 expand during charging etc., the condition shown in FIG. 17 is produced, with stress being concentrated in the portions shown by Q in FIG. 18. Such stress concentration produces creep deformation and this gives rise to the problem that the durability of battery cases 36 and electrical connecting rods 41 in regard to vibration and impact is severely impaired.

An object of the present invention is to solve the above problems and to provide a sealed secondary battery assembly of excellent cooling construction.

DISCLOSURE OF THE INVENTION

In order to achieve the above objects, the present invention provides a sealed secondary battery assembly in which electricity-generating elements are accommodated in battery cases formed in rectangular tubular shape having a bottom, and a plurality of cells constituted by sealing the apertures of these battery cases by covers are arranged in series, these cells being electrically connected by means of electrical connection elements, characterized in that the battery cases of the individual cells are constituted by a unitary battery case and the electrical connection elements are arranged so as to pass through partition sections that define the space for the individual cells, and coolant passages that communicate with the outside are formed in the partition sections.

With the above construction, since the battery cases of the individual cells are constituted by a unitary battery case, even if the individual cells expand during charging etc., the stress that is generated under these circumstances is not concentrated in a specific location (P of FIG. 17 and Q of FIG. 18) but is dispersed to the entire partition section that defines the space of the individual cells. A sealed secondary battery assembly of excellent durability in regard to vibration or impact can therefore be provided.

Also, with the above construction, the sealing structure becomes simple, since an internally connected structure i.e. a structure whereby the electrical connection elements are arranged so as to pass through the partition section is adopted. Also compactness of the secondary battery can be achieved.

Furthermore, with the above construction, since coolant passages that communicate with the outside are formed in the partition sections, effective cooling of the secondary battery can be achieved by forcibly passing cooling air for example to these coolant passages.

If a construction is adopted whereby the battery cases of the individual cells are separately manufactured and a unitary battery case is constituted by joining up these battery cases, and irregularities are provided on the connection face of each battery case in order to form coolant passages, the following benefits are obtained. Since manufacture of the individual battery cases is easy and the width of the coolant passages (gap in the direction of connection of the cells) can be made narrower than with a unitary battery case consisting of a unitary molding, to be described, the dimension of the sealed secondary battery assembly in the cell connection direction can be made shorter i.e. it can be made more compact. Specifically, owing to the difficulty of the molding technique, a unitary battery case consisting of a unitary molding can only be formed with coolant passages of minimum width about 5 mm; making this width any smaller is very difficult in terms of mass production. However, if a construction is adopted in which the coolant passages are formed on joining up the battery cases by providing irregularities for formation of coolant passages in the connecting faces of the individual battery cases, this width can be reduced down to about 2 mm, so increased compactness of the sealed secondary battery assembly can be achieved.

If a construction is adopted such that a projection is provided on the connecting faces of each battery case and the coolant passages are formed by bringing these projections into abutment on connection, standardization of the individual battery cases is facilitated.

According to the above invention, if the battery cases are made of resin and these battery cases are joined up by welding or adhesion, a large molding machine or the like for molding a unitary battery case is unnecessary, so manufacture of the sealed secondary battery assembly is facilitated. The joining by welding or adhesion could be performed over the entire surface between the connecting faces of the battery cases, excluding the spaces for formation of the coolant passages, but it could alternatively be performed at the sides of the battery cases. The latter is suited in particular for joining by a welding operation.

On the other hand, as regards mass production characteristics, it is particularly advantageous, where a construction is adopted whereby the unitary battery case consists of a unitary molding, for this unitary battery case to be made of resin.

According to the above invention, if a construction is adopted whereby end plates and restraining straps are arranged at the lateral periphery of the unitary battery case, so that the unitary battery case is restrained by these, the drawback that joining between battery cases is weak in regard to tensile strength can be overcome.

According to the above invention, if a construction is adopted whereby the covers of the individual cells are constituted by a mutually integrated unitary cover, in particular if the unitary cover is made a unitary resin molding, the apertures of the battery cases can all be sealed at once by this unitary cover, thereby enabling efficiency of the operation to be increased. Also, since the peripheries of the upper edges of the unitary battery case can be restrained by this unitary cover, in particular in the case of a unitary battery case of the type constituted by joining individual battery cases, increased durability can be achieved.

According to the above invention, if the unitary cover is provided with apertures of the coolant passages, coolant can flow smoothly utilizing these apertures, so a better cooling effect can be obtained.

The direction of formation of the coolant passages may be the vertical direction, left/right direction, inclined vertical direction, or a combination of these. In particular, smooth flow of the coolant is obtained with the vertical direction.

In particular, if a construction is adopted wherein the apertures of the coolant passages provided in the unitary cover are arranged alternately to left and right with respect to the center line in the direction of connection of the cells, and the electrical connection elements are arranged in symmetrical positions of the apertures and alternately to left and right with respect to the center line, the flow of coolant in the vertical direction is made smooth, thereby enabling a better cooling effect to be achieved.

Further, in order to achieve the above object, the present invention provides a sealed secondary battery assembly wherein electricity-generating elements are accommodated in battery cases formed in rectangular tubular shape having a bottom, and a plurality of cells constituted by sealing the apertures of these battery cases by covers are arranged in series, these cells being electrically connected by means of electrical connection elements, characterized in that the individual cells are unified by being restrained by end plates and restraining straps and the covers are constituted by a unitary cover consisting of a unitary molding; the electrical connection elements are arranged so as to pass through partition sections that define the space for the individual cells, and coolant passages are formed in the partition sections; and apertures communicating with these coolant passages are provided in locations of the unitary cover corresponding to the coolant passages.

BEST MODE FOR CARRYING OUT THE INVENTION

An embodiment of the present invention is described below with reference to the drawings.

This embodiment relates to a nickel/hydrogen secondary battery assembly developed as a drive power source for an electric vehicle. In this secondary battery, as shown in FIG. 1 to FIG. 6, electricity-generating elements 1 are accommodated in battery cases 3 made of resin formed in the shape of rectangular tubes having a bottom; ten cells 2$a$ to 2$j$ constituted by sealing the apertures of battery cases 3 by means of covers 4 made of resin are arranged in a row, and these are electrically connected in series.

The battery cases 3 of the cells 2a to 2j are mutually connected using welding means, thereby constituting a unitary battery case 51.

Covers 4 are constituted by a unitary cover 52 consisting of a unitary resin molding whose internal space is divided into independent cells 2a to 2j by means of partition sections 53 (see FIG. 6) provided on this unitary cover 52.

When battery cases 3 are joined up, the two adjacent joining walls 54a, 54b constitute a partition section 54 that divides each cell 2a to 2j. Cells 2a to 2j are electrically connected in series by arranging electrical connection elements 9 through partition sections 54 of these battery cases 3.

In partition sections 53 of covers 4 and partition sections 54 of battery cases 3, there are respectively formed coolant passages 55, 56 that communicate with the outside. Cooling of cells 2a to 2j is performed by forcibly passing cooling air through these coolant passages 55, 56.

The battery cases 3 of cells 2a to 2j are integrally formed of resin such as PP/PPE alloy. On the outer surfaces (connecting faces) 57 of joining walls 54a, 54b constituting the side walls on the longest side of these battery cases 3, there are arranged a plurality of air current guides (projections) 15 for forming coolant passages 56. In the example shown in FIG. 8 and FIG. 9, in each case six air current guides 15 are provided in projecting fashion extending in the form of strips in the vertical direction of respective outer surfaces 57 of the two joining walls 54a, 54b, including the air current guides 15 at both side ends. These air current guides 15 extend from the bottom face of battery case 3 as far as a position about ¾ of the height of battery case 3; no air current guides 15 are present in about the top ¼ of connecting face 57. In the regions where these air current guides 15 are not present, there are provided a plurality of point-form projections 16 in the form of short cylindrical pillars to ensure proper spacing. The amount of projection of these point-form projections 16 from connecting face 57 is constituted to be equal to that of air current guides 15.

Figure 8:
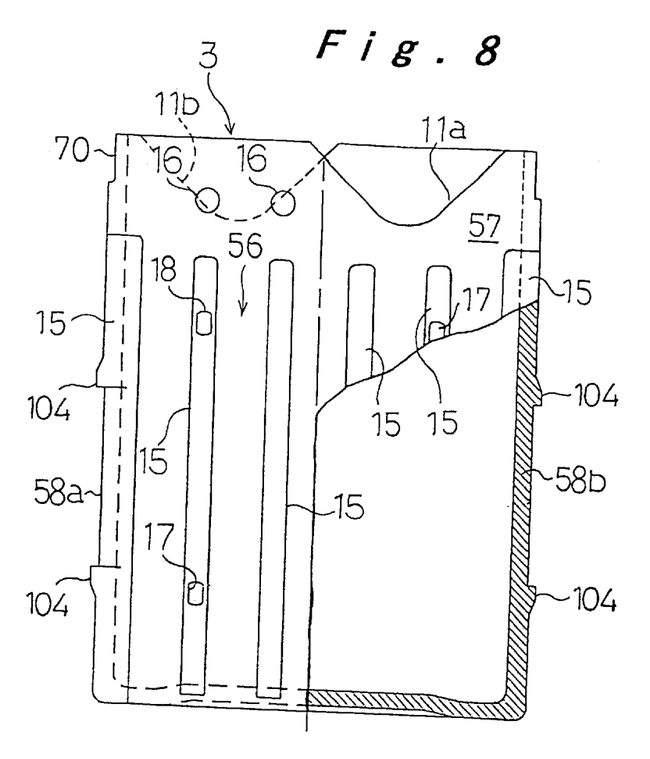
FIG. 8 is a partially sectioned front view showing the battery case.
Figure 9:
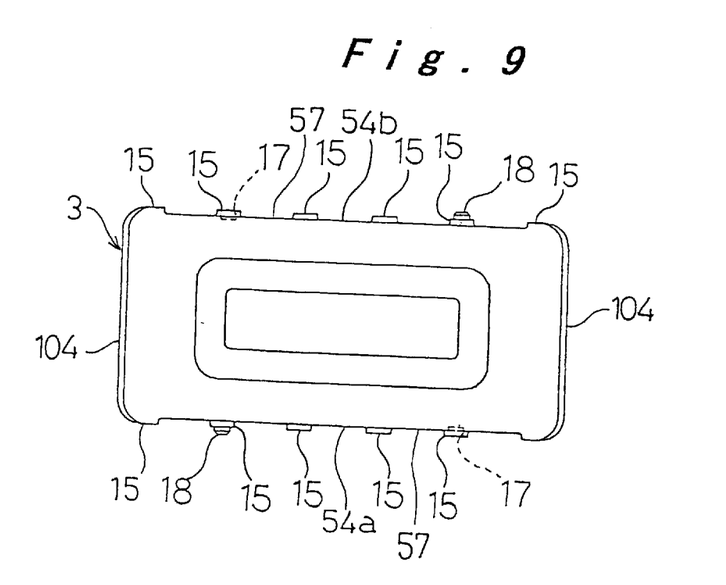
FIG. 9 is a bottom view showing the battery case.

In FIG. 8 and FIG. 9, 17 are position-locating recesses and 18 are position-locating projections that fit into position-locating recesses 17; these are provided on prescribed air current guides 15.

Also on the respective outer faces of left and right side walls 58a, 58b constituting the side walls on the shortest sides of battery cases 3, there are provided in projecting fashion in the horizontal direction a pair of upper and lower restraining ribs 104 that restrain movement in the vertical direction of a restraining strap 14.

Furthermore, on the upper sides of the two joining walls 54a, 54b of battery cases 3, there are formed V-shaped recesses 11a, 11b. One recess 11a is arranged offset in one direction in the left/right direction from the center of this upper side, while the other recess 11b is arranged offset in the other direction in the left/right direction from the center of this upper side.

Figure 10:
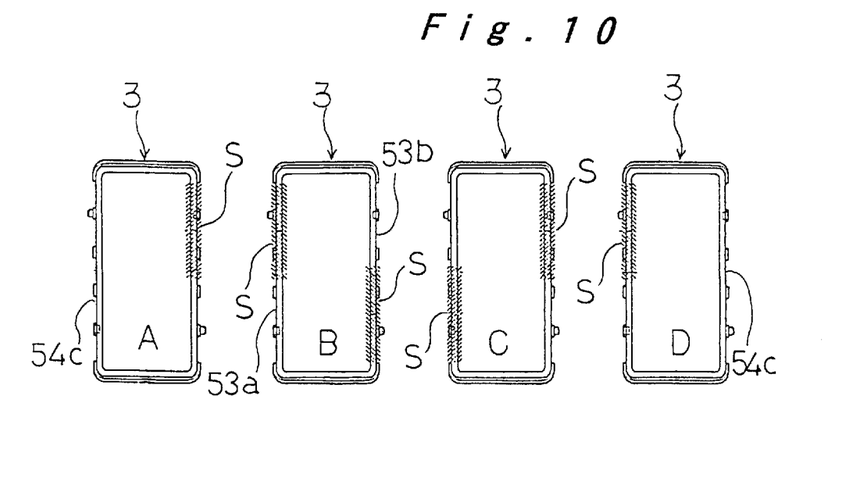
FIG. 10 is a plan view showing various types of battery case.

In the example described above, recesses 11a, 11b were provided on respectively both joining walls 54a, 54b of battery cases 3, but recesses 11a, 11b are unnecessary, and in fact might be detrimental on the side walls 54c on the outside of battery cases 3 of cells 2a, 2j positioned at both ends. Accordingly, as shown in FIG. 10, four types of battery case 3 were manufactured, taking into account the necessity for recesses 11a, 11b and left/right symmetry. In FIG. 10, the battery case indicated by A for use in cell 2a is a battery case 3 that is not provided with a recess S (indicated in FIG. 10 by hatching) on the outside side wall 54c. The battery case indicated by B is a battery case 3 for cells 2b, 2d, 2f, 2h, as described with reference to FIG. 8 and FIG. 9. The battery case indicated by C is an battery case 3 for cells 2c, 2e, 2g, 2i, having a recess S in a position symmetric with the recess of B. The battery case indicated by D is a battery case for cell 2j, wherein these are provided in positions symmetric with the recess of A and the outside side wall 54c.

Figure 4:
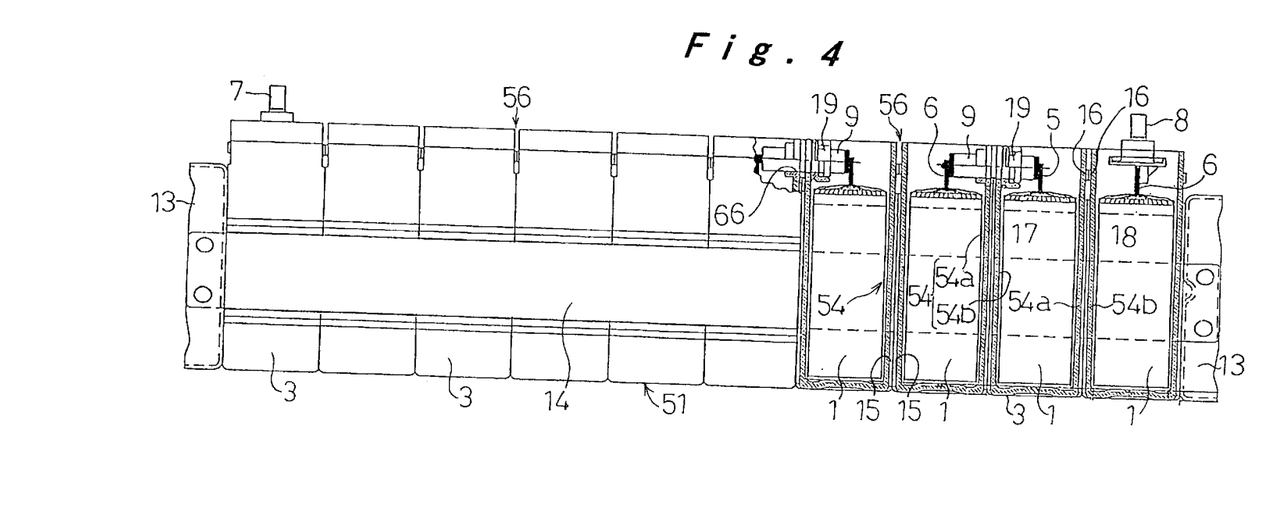
FIG. 4 is a partially sectioned front view showing the unitary battery case.
Figure 11:
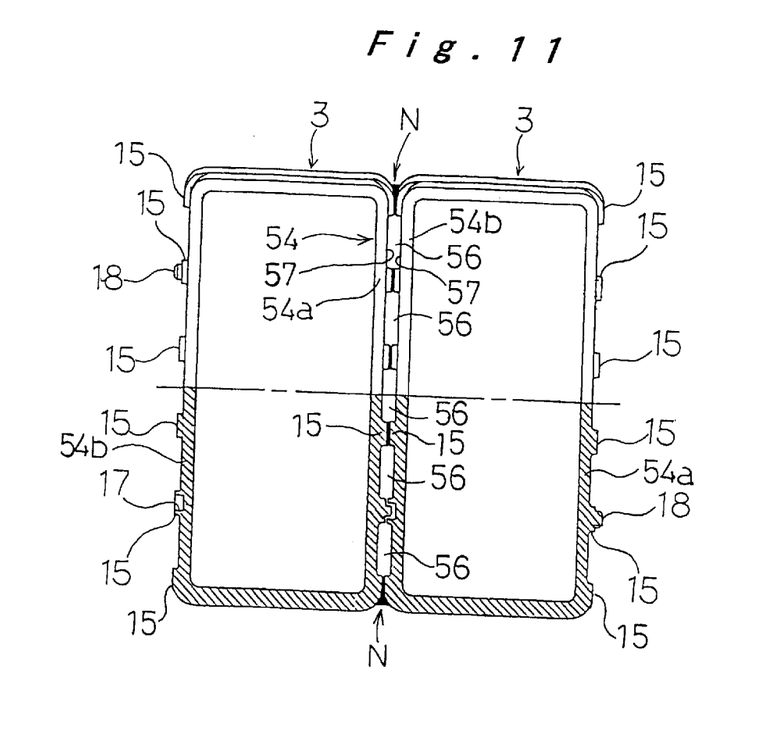
FIG. 11 is a partially sectioned plan view showing the joined condition between the battery cases.

Ten battery cases 3 are mutually joined by welding to form a unitary battery case 51. That is, as shown in FIG. 11 and FIG. 4, in a condition with air current guides 15 and point-form projections 16 of joining walls 54a, 54b of adjacent battery cases 3 abutting each other, and with position-locating projections 18 located by fitting into position-locating recesses 17, battery cases 3 are joined up along the boundary lines N of two joining walls 54a, 54b (specifically, the line of connection of air current guides 15 formed at the two side end parts), by heating the portions in the vicinity of this line from outside so that the resin is melted, then solidifying the resin. Also at this point the recesses 11a, 11b of the two joining walls 54a, 54b that are in joining relationship are in overlapping positions.

Coolant passages 56 that guide the air (coolant) in the upwards direction are formed by the two joining walls 54a, 54b, specifically, by air current guides 15, 15 provided on partition section 54, when these are in joining relationship. Also, in the approximately ¼ top portion of partition sections 54, by effecting contact of point-form projections 16, 16 in an abutting condition, a space whereby air can be guided vertically and to left and right is formed between battery cases 3. Consequently, air flow that is guided upwards by air current guides 15 is guided towards covers 4 (upwards) and can be made to flow out at the sides of battery cases 3 in the left/right direction.

In this embodiment, projections such as air current guides 15 are provided on connecting faces 57 of each battery case 3 and coolant passages 56 are formed by bringing fellow projections into contact when joining. The reason for this is that the amount of projection of air current guides 15 or point-form projections 16 from connecting face 57 can be made very small (for example of the order of 1 mm) and as a result the width of coolant passage 56 in the cell connection direction can be made small (for example of the order of 2 mm); this is therefore advantageous in achieving compactness of the sealed secondary battery assembly.

For the joining of battery cases 3, apart from welding, adhesive could be employed. Also, adhesive joining or welding could be applied to all the contacting portions of the two connection faces 57.

Electricity-generating elements 1 are accommodated in battery cases 3 as shown in FIG. 4. In electricity-generating element 1 constituted by stacking a plurality of positive electrode plates and negative electrode plates with intervening separators and filling with electrolyte, a positive electrode terminal 5 at which are collected the leads from each positive electrode plate and a negative electrode terminal 6 at which are collected the leads from each negative electrode plate are formed. Positive electrode terminal 5 is offset in one direction in the left/right direction and negative electrode terminal 6 is arranged in a position offset in the other direction in the left/right direction.

Positive electrode terminal post 7 is connected to positive electrode terminal 5 of cell 2a positioned at one end, while negative electrode terminal post 8 is connected to negative electrode terminal 6 of cell 2j positioned at the other end. This positive electrode terminal post 7 and negative electrode terminal post 8 constitute the positive electrode and negative electrode terminals of the sealed secondary battery assembly as a whole.

Figure 12:
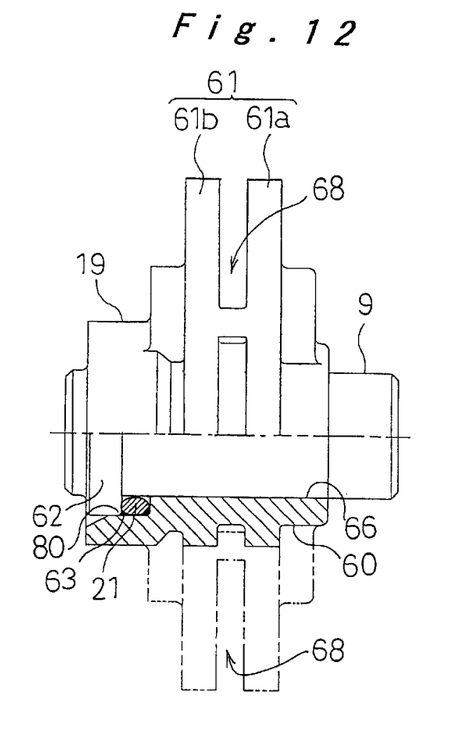
FIG. 12 is a partially sectioned plan view showing an electrical connection element and a support element thereof.
Figure 13:
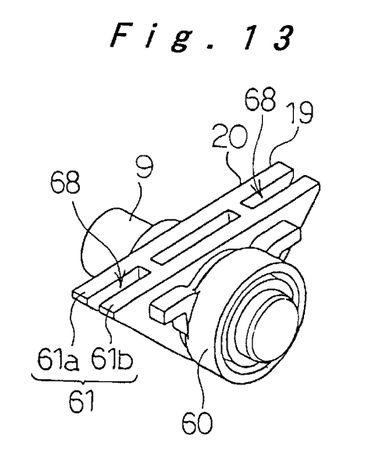
FIG. 13 is a perspective view showing the electrical connection element and support element.

The pair of joining walls 54a, 54b that are in joining relationship constitute a partition section 54 that defines the space for each cell in unitary battery case 51. A metallic rod (electrical connection element) 9 made of nickel that passes through this partition section 54 in the horizontal direction is fixed to a support element 19 integrally formed of resin such as PP/PPE alloy. This support element 19 comprises a holding tube 60 and a triangular flange 61 whose upper side is horizontal. As shown in FIG. 12 and 13, metallic rod 9 is pressed into and passes through holding tube 60 and is thereby held. Flange 61 fits into the recesses (support element mounting passage sections) 11a, 11b provided in the upper side of connecting walls 54a, 54b. The internal diameter of through-hole 66 of holding tube 60 is formed somewhat smaller than the external diameter of metallic rod 9. Also the aperture 80 at one end of holding tube 60 is formed so as to have an internal diameter larger than that of the other portions. Flange 61 is provided with two vanes 61a, 61b, an air flow space 68 being provided formed between the two vanes 61a, 61b on the left and right of flange 61. This air flow space 68 is beneficial in making the flow of cooling air smooth. The two vanes 61a, 61b contact the respective recesses 11a, 11b of joining walls 54a, 54b in one-to-one correspondence.

Figure 14:
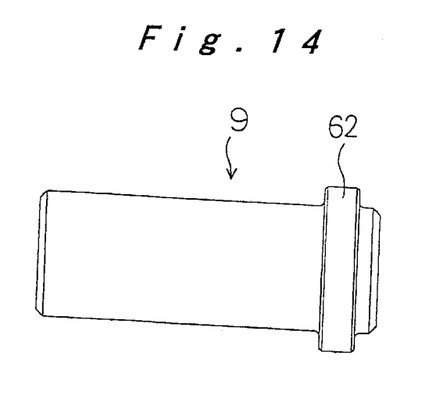
FIG. 14 is a front view showing the electrical connection element.

Metallic rod 9 is formed as a cylinder having a head 62 that is pressed into holding tube 60. This metallic rod 9 is pressed into through-hole 66 of support element 19. By applying ultrasonic vibration to metallic rod 9 during this pressing-in, the resin of support element 19 is melted around metallic rod 9 by frictional heating produced by this vibration. By this means, the pressing-in operation is made possible and takes place in a smooth fashion; moreover, sealing characteristics are improved by the solidification of the molten resin. An O-ring 21 is arranged in the aperture (holding groove) 80; during the pressing-in, this is compressed by head 62 of metallic rod 9. This compressed O-ring 21 is in pressure contact with the circumference of metallic rod 9, thereby contributing to improvement in sealing. Also, soft sticky sealant 63 is applied to the inner circumferential surface of aperture 80 and metallic rod 9 and O-ring 21, thereby further improving sealing.

In this embodiment, the pressing-in operation was performed while applying ultrasonic vibration to metallic rod 9, but the pressing-in operation could be performed while heating metallic rod 9, or while applying both heat and ultrasonic vibration to metallic rod 9. Furthermore, metallic rod 9 could simply be inserted into support element 19 simply by a pressing-in operation only.

Figure 15:
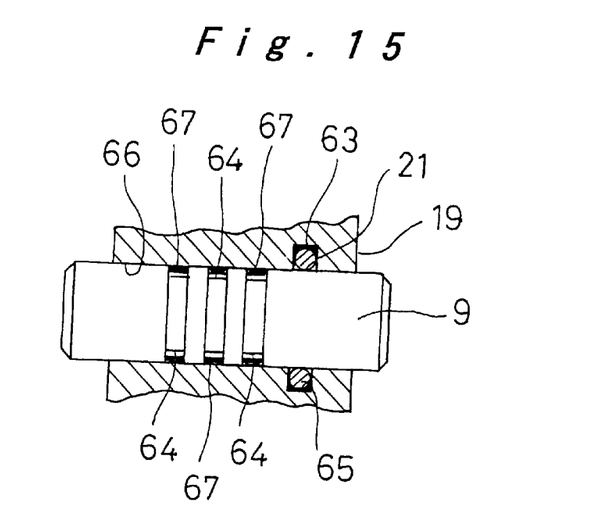
FIG. 15 is a cross-sectional view showing a modified example of the electrical connection element and support element thereof.

Also, as shown in FIG. 15, it is possible to adopt an arrangement in which a plurality of grooves 64 are provided around the circumference of metallic rod 9 and a holding groove 65 is formed that holds O-ring 21, metallic rod 9 being pressed in into through-hole 66 of supporting element 19, while applying ultrasonic vibration, heating or both of these. Soft sticky sealant 63 is applied to holding groove 65 and grooves 64. By such an arrangement, a portion 67 of the resin of support element 19 is melted out into grooves 64 and by subsequent solidification 5 movement in the axial direction of metallic rod 9 is restrained, so that fixing of the metallic rod 9 into support element 19 can be performed in a reliable fashion.

Figure 3:
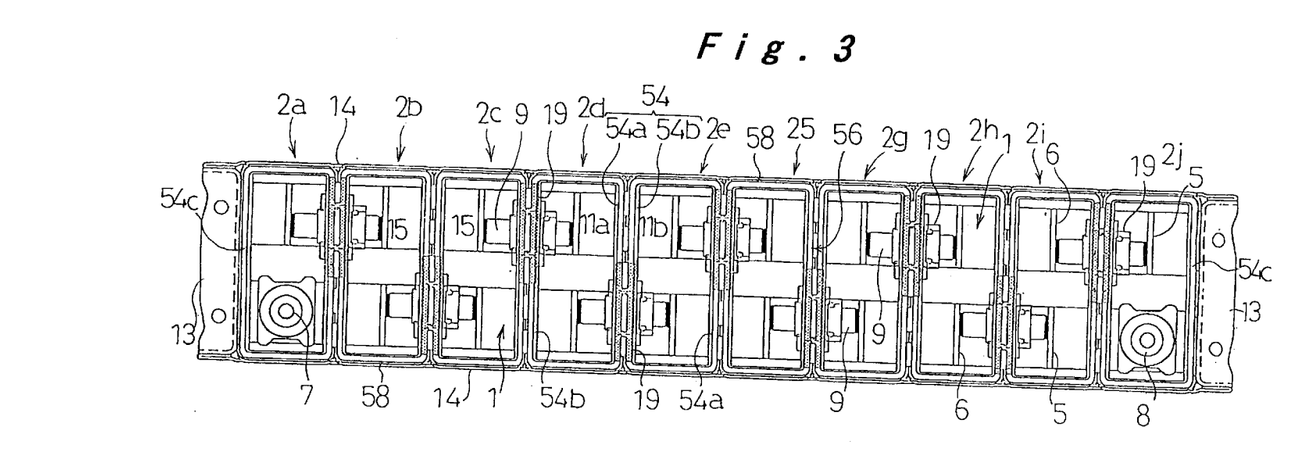
FIG. 3 is a plan view showing the unitary battery case.
Figure 7:
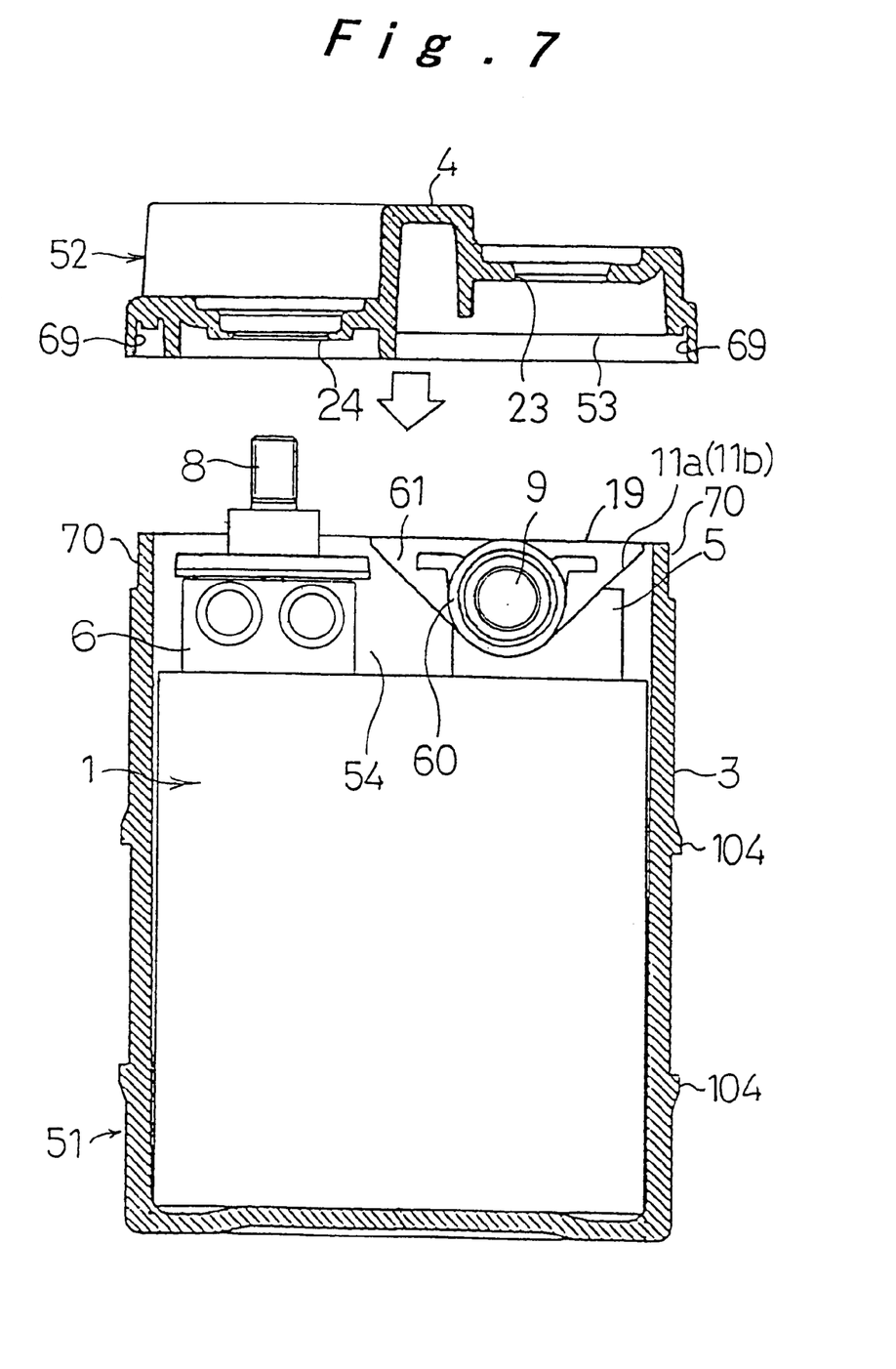
FIG. 7 is a cross-sectional view showing the relationship between a cover and a battery case.

In this way, as shown in FIG. 3, FIG. 4 and FIG. 7, support element 19 with the metallic rod (electrical connection element) 9 fixed thereto is fitted in by respectively bringing the pair of vanes 61a, 61b into contact with the pair of recesses 11a, 11b provided in partition section 54 i.e. the pair of joining walls 54a, 54b, and is joined to joining walls 54a, 54b by welding using a heat welder. If support element 19 and battery cases 3 are formed of the same type of resin, for example PP/PPE alloy, the above welding operation can be performed smoothly and reliably. Also, as shown in FIG. 7, the upper side of support element 19 and the upper side of partition section 54 may be constituted in a coplanar condition.

Figure 1:
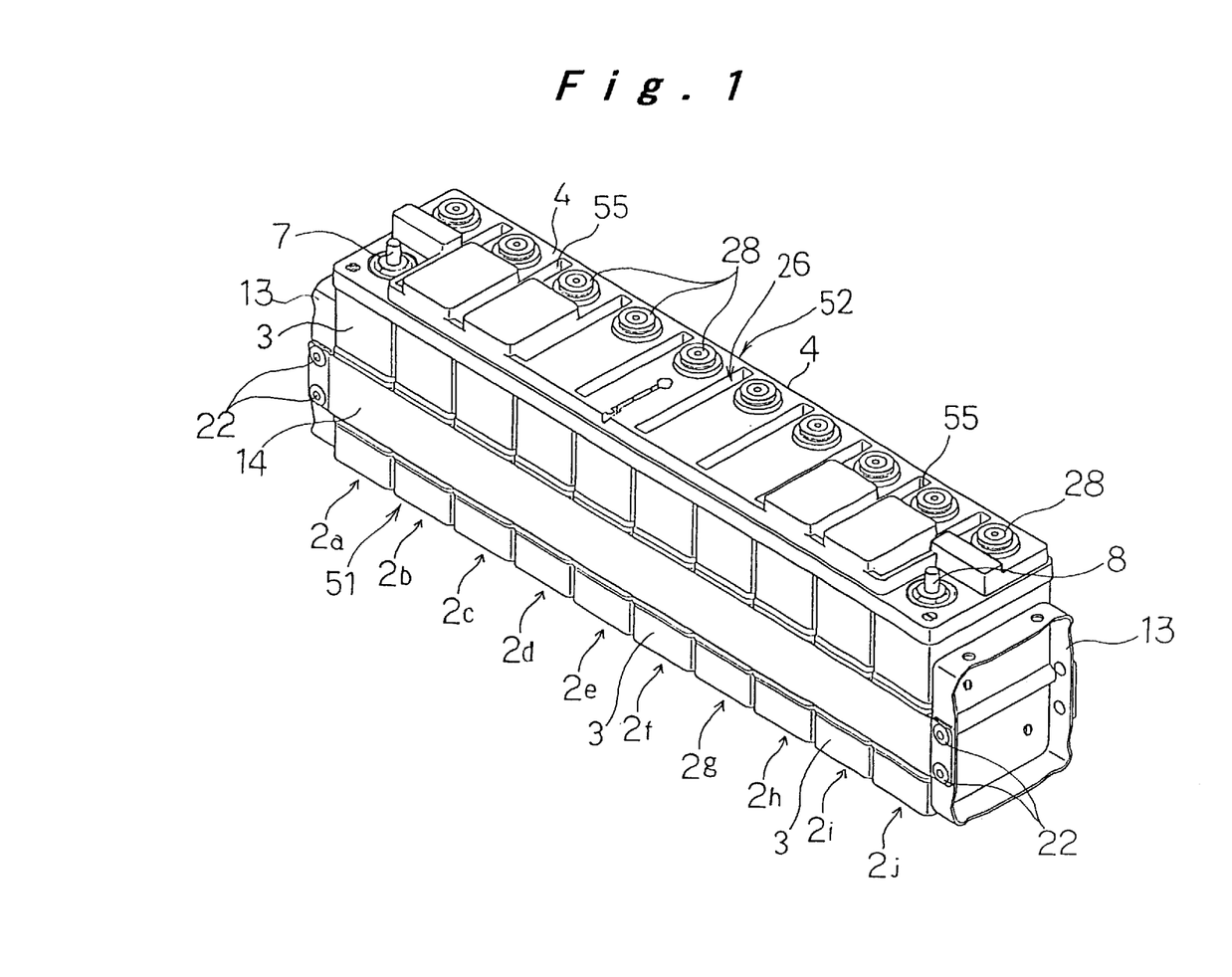
FIG. 1 is a perspective view showing the whole of an embodiment of the present invention.
Figure 2:
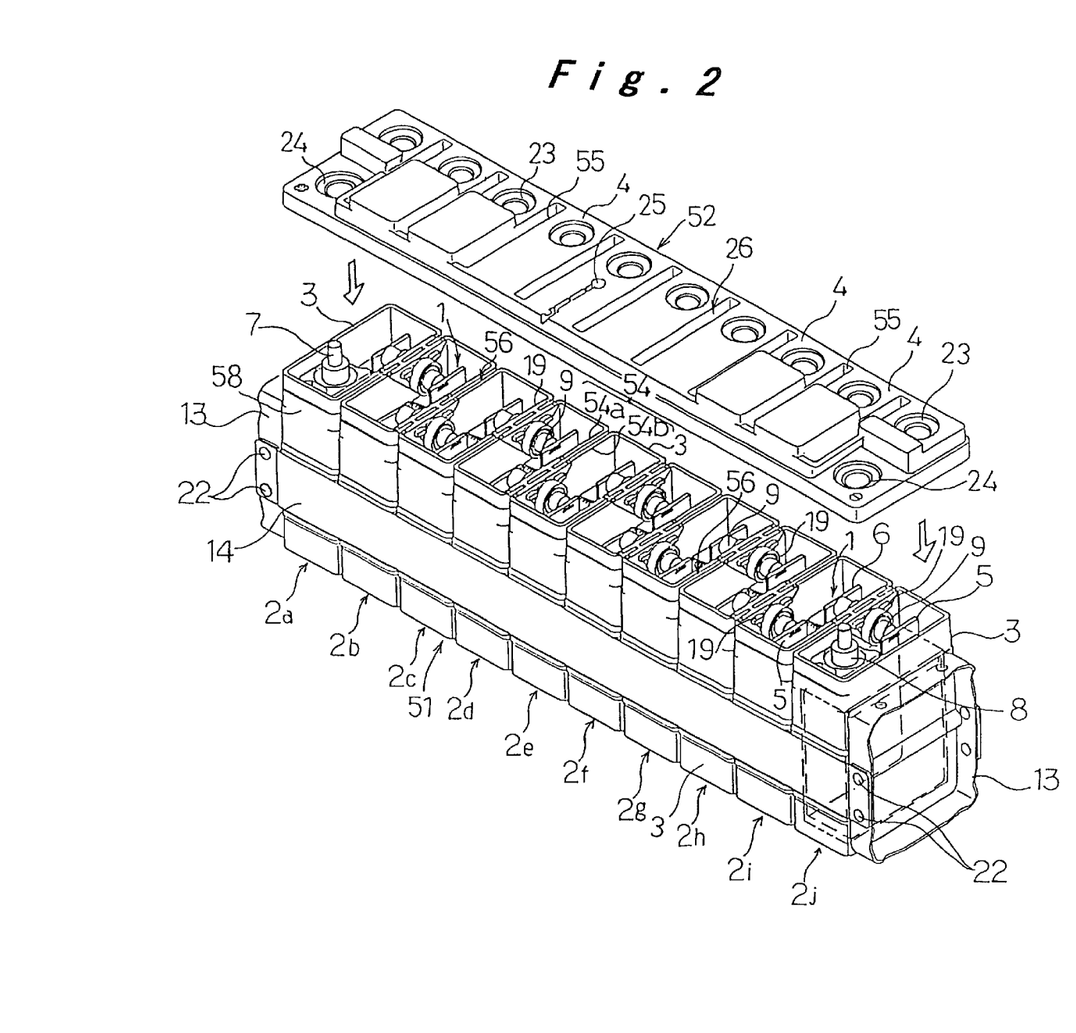
FIG. 2 is a perspective view showing the above embodiment with a unitary cover and unitary battery case in separated condition.
Figure 5:
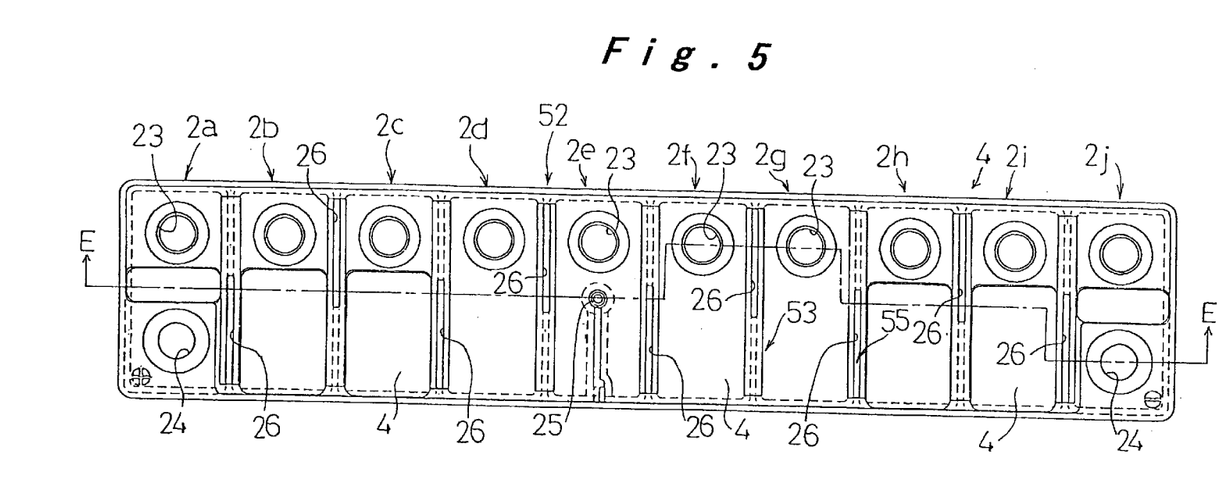
FIG. 5 is a plan view showing the unitary cover.
Figure 6:
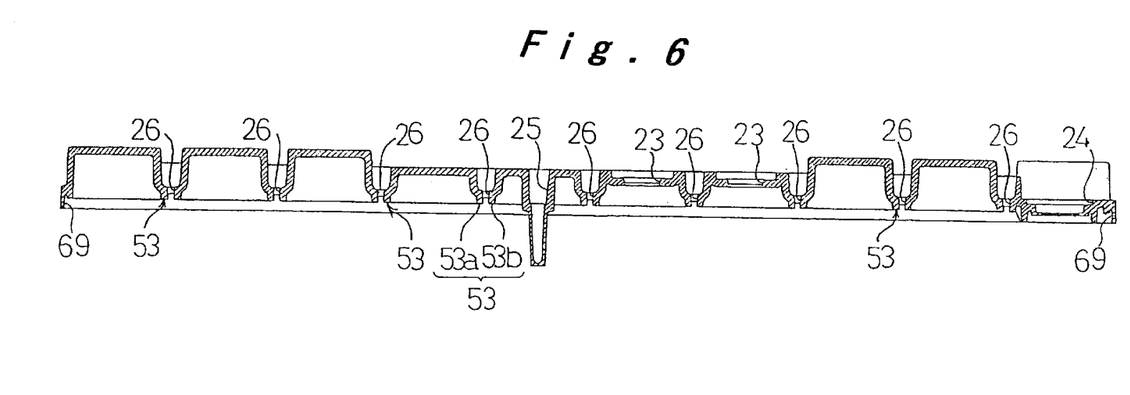
FIG. 6 is a cross-sectional view along the line E—E of FIG. 5 showing the unitary cover.

As shown in FIG. 2, FIG. 5, and FIG. 6, unitary cover 52 is integrally formed using as raw material resin such as PP/PPE alloy, and is provided with partition sections 53 for independently partitioning its internal space into individual cells 2a to 2j. As shown in FIG. 6, these partition sections 53 comprise two partitions 53a, 53b and are formed with an aperture 26 for releasing coolant air therein to the outside. As shown in FIG. 5, these apertures 26 are arranged alternately on the left and right of the center line in the direction of connection of the cells. Also the undersides of the two partitions 53a, 53b 30 contact in one-to-one correspondence the upper side of the two joining walls 54a, 54b of partition section 54 of the battery case and the upper sides of the two vanes 61a, 61b of support element 19.

In unitary cover 52, there are provided terminal post fixing holes 24 for inserting and fixing positive electrode terminal posts 7 and negative electrode terminal posts 8, a safety valve mounting hole 23 for mounting a safety valve 28 (see FIG. 1) and a thermistor mounting section 25 for mounting a thermistor for temperature measurement.

As shown in FIG. 7, a step 69 for fitting purposes is formed in expanded form at the outer periphery of the bottom edge of unitary cover 52. Unitary cover 52 is assembled on to unitary battery case 51 with this superimposed on a fitting step 70 provided at the upper edge of each individual battery case 3. Unitary cover 52 and unitary battery case 51 are joined by welding or adhesion etc.

By joining up and unifying unitary cover 52 and unitary battery case 51, the two partition sections 53, 54 are brought into contact and the cells 2a to 2j come to have respectively independent spaces. Also in the two partition sections 53, 54, coolant passages 55, 56 that communicate with each other and also communicate with the outside are formed. Specifically, when for example cooling air is forcibly made to flow upwards from the bottom face of unitary battery case 51, this air current flows upwards guided by air current guides 15 until, at the top of battery case 3, at the location where point-form projections 16 are provided, part of it flows out sideways while the rest flows out upwards from apertures 26 provided in unitary cover 52. By means of such an air flow, the individual battery cases 3 constituting unitary battery case 51 can be effectively cooled. It should be noted that, in order to make the flow of this air smooth, as shown in FIG. 2, the apertures 26 provided in unitary cover 52 are arranged alternately to left and right with respect to the center line in the direction of connection of the cells, and support elements 19 in which are fixed the electrical connection elements (metallic rods) 9 are arranged alternately to left and right with respect to the center line and in symmetric positions of apertures 26.

Since unitary battery case 51 is joined by welding individually manufactured battery cases 3, there are some problems in relation to its tensile strength. In order to overcome this problem, end plates 13 are arranged on both outside ends of unitary battery case 51 and the ends of a pair of left and right restraining straps 14 are coupled by rivets 22 to these end plates 13 thereby binding unitary battery case 51 tightly.

Apart from the embodiment of the present invention illustrated above, it could be constituted in various modes. For example, the unitary case could be constituted by a unitary resin molding. Alternatively, a unitary cover could be constituted by joining up individually manufactured covers. Also, for the cover, it is not necessarily essential to employ a unitary cover and a construction could be adopted in which respectively independent covers are provided on each cell. Furthermore, the electrical connection elements could be fixed to the support elements by insert molding, or the electrical connection elements could be directly fixed to the unitary battery case or unitary cover. Also, a sealed secondary battery assembly can be constructed by unifying the individual cells, without using adhesive or welding means, by restraining these by end plates and restraining straps and constituting the covers by a unitary cover consisting of a unitary molding and, as already described, arranging electrical connection elements so as to pass through the partition sections that define the individual cells and forming coolant passages in the partition sections, and, in addition, providing apertures that communicate with these coolant passages at locations of the unitary cover corresponding to the individual coolant passages.

INDUSTRIAL APPLICABILITY

With the present invention, durability in regard to vibration or impact, an excellent cooling structure, compactness and a high degree of safety can be achieved, so it is useful as a sealed secondary battery assembly.

What is claimed is:

1. A sealed secondary battery assembly, comprising:

electricity-generating elements;

battery cell cases formed as rectangular tubes having a bottom, opposing partition walls and opposing side walls defining a cell case aperture, said electricity-generating elements being disposed respectively in said battery cell cases;

battery cell case covers sealing said cell case apertures to form a plurality of sealed battery cells, said cell case covers being formed contiguous as a unitary cover;

said battery cell cases being disposed serially adjacent one another and said partition walls having partition wall surfaces with contacting portions contacting adjacent ones of said partition walls, said contacting portions being fixed together to form a unitary battery case, said partition walls thereby forming partition sections of said unitary battery case which partition said sealed battery cells from one another;

electrical connection elements passing through said partition sections, formed by the partition walls, to serially connect said electricity-generating elements without use of electrical connection members extending through said battery cell case covers; and said partition walls defining coolant passages in said partition sections.

2. The sealed secondary battery assembly according to claim 1, wherein:

said unitary battery case is formed by manufacturing said battery cell cases separately, and joining said battery cell cases at said contacting portions; and said partition wall surfaces having surface structure which defines said coolant passages.

3. The sealed secondary battery assembly of claim 2, wherein said surface structure includes projections provided on said partition wall surfaces such that said coolant passages are formed by abutment of said projections when said battery cell cases are joined.

4. The sealed secondary battery assembly of claim 2, wherein said battery cell cases are made of resin and are joined by one of welding and adhesion.

5. The sealed secondary battery assembly of claim 4, wherein at least some of said battery cell cases are joined on both of said partition wall surfaces.

6. The sealed secondary battery assembly of claim 1, wherein said unitary battery case is formed by a unitary molding.

7. The sealed secondary battery assembly of claim 6, wherein said unitary battery case is made of resin.

8. The sealed secondary battery assembly of claim 1, further comprising:

end plates disposed on exposed ones of said partition wall surfaces at ends of said unitary battery case; and restraining straps connecting said end plates and disposed about a lateral periphery of said unitary battery case to restrain said unitary battery case.

9. The sealed secondary battery assembly of claim 1, wherein said unitary cover is a resin unitary molding.

10. The sealed secondary battery assembly of claim 1, wherein said unitary cover defines cooling passage apertures acting as ports of said coolant passages.

11. The sealed secondary battery assembly of claim 10, wherein:

said cooling passage apertures are provided in said unitary cover alternating left and right with respect to a center line extending in a direction of said serial disposal of said battery cell cases; and said electrical connection elements are arranged alternating left and right with respect to said center line.

12. The sealed secondary battery assembly of claim 1, wherein said coolant passages lead coolant in a vertical direction.

13. A sealed secondary battery assembly, comprising:

electricity-generating elements;

battery cell cases formed as rectangular tubes having a bottom, opposing partition walls and opposing side walls defining a cell case aperture, said electricity-generating elements being disposed respectively in said battery cell cases;

battery cell case covers sealing said cell case apertures to form a plurality of sealed battery cells;

said battery cell cases being disposed serially adjacent one another and said partition walls having partition wall surfaces with contacting portions contacting adjacent ones of said partition walls thereby forming an assembled battery case, said partition walls forming partition sections which partition said sealed battery cells from one another;

end plates disposed on exposed ones of said partition wall surfaces at ends of said assembled battery case;

restraining straps connecting said end plates and disposed about a lateral periphery of said assembled battery case to pull together said battery cell cases to form said assembled battery case;

said battery cell case covers being serially disposed and formed as a unitary cover which is a unitary molding;

electrical connection elements passing through said partition sections, formed by the partition walls, to serially connect said electricity-generating elements without use of electrical connection members extending through said battery cell case covers;

said portion walls defining coolant passages in said partition sections; and said battery cell case covers defining apertures communicating with said coolant passages and disposed at locations said unitary cover corresponding to said coolant passages.

* * * * *